United States Patent
Meerwald et al.

(10) Patent No.: US 7,773,495 B2
(45) Date of Patent: *Aug. 10, 2010

(54) DISC SIGNATURE FOR DISC AUTHENTICATION

(75) Inventors: Peter Meerwald, Elsbethen (AT); Andreas Winter, Altenmarkt (AT); Oliver Kubera, Florian (AT); Gunther Kattner, Hallein (AT); Harald Herwig Gabl, Hallein (AT)

(73) Assignee: SONY DADC Austria AG, Anif (AT)

( * ) Notice: Subject to any disclaimer, the term of this patent is extended or adjusted under 35 U.S.C. 154(b) by 1061 days.

This patent is subject to a terminal disclaimer.

(21) Appl. No.: 11/299,811

(22) Filed: Dec. 12, 2005

(65) Prior Publication Data
US 2006/0153052 A1    Jul. 13, 2006

(30) Foreign Application Priority Data
Dec. 14, 2004   (EP) .................................. 04029583

(51) Int. Cl.
*G11B 7/24* (2006.01)
(52) U.S. Cl. ................................. 369/275.3
(58) Field of Classification Search .............. 369/275.1, 369/275.3, 272.1
See application file for complete search history.

(56) References Cited

U.S. PATENT DOCUMENTS

| 6,744,909 B1 * | 6/2004 | Kostrzewski et al. ........ 382/115 |
| 2005/0063255 A1 * | 3/2005 | Blaukovitsch et al. ... 369/13.35 |

FOREIGN PATENT DOCUMENTS

| WO | WO 03/015088 | 2/2003 |
| WO | WO 03/054878 | 7/2003 |

* cited by examiner

*Primary Examiner*—Tan X Dinh
*Assistant Examiner*—Andrew J Sasinowski
(74) *Attorney, Agent, or Firm*—Oblon, Spivak, McClelland, Maier & Neustadt, L.L.P.

(57) ABSTRACT

The invention relates to a memory authentication method based on a pattern of storage areas of said memory that have altered latencies that are respectively altered such that the respective alteration of the latency of a storage area lies within a measurement noise of latency measurements in respect to the standard latency of said storage area when the measurement is performed with a reading device for accessing said record medium. The verification is then performed by a correlation of the latencies of the altered storage areas with a key used to alter the storage areas.

11 Claims, 10 Drawing Sheets

DISC SIGNATURE FOR DISC AUTHENTICATION

Figure 1:
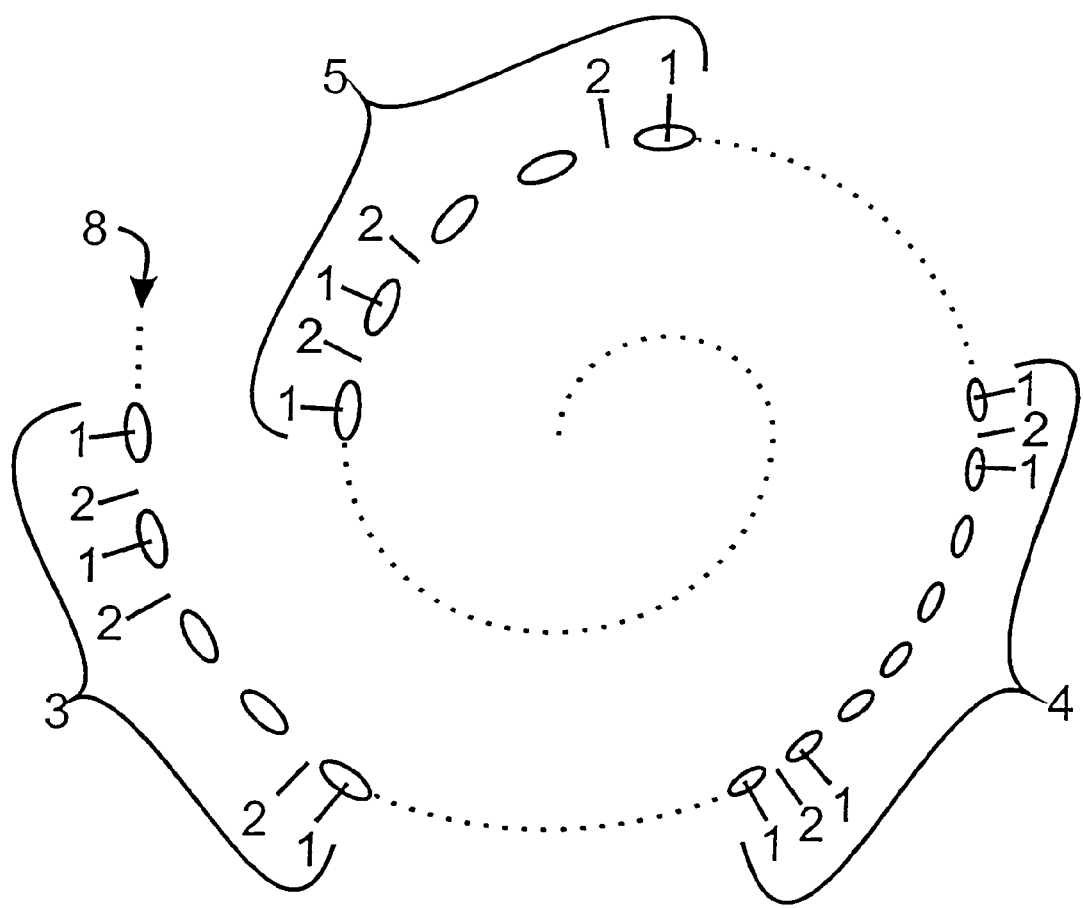

The present invention relates to a copy protection method for record media, e.g. storage media or record carriers. In particular the present invention relates to a copy protection and to a copy control mechanism by authentication of record carriers.

Such record carriers might store digital data as an asynchronous signal, e.g. Compact Discs (CDs) and Digital Versatile Discs (DVDs) including all existing or future formats of CD and DVD or other Optical Storage Media which may work according to a similar concept, e.g. the Blu-Ray Disc and HD-DVD. Also, recordable record carriers like CD-R or DVD-R might be copy-protected according to the present invention.

Optical storage discs with information stored on one or both sides and/or in several layers have come to be used for a variety of purposes, most notably in the music, games, video and computer industry. Digital information is stored on the optical storage media in the form of pits arranged along helical track(s) on one or on both sides of the disc and/or in several layers. Each track is typically read from the inside out, but may also be read form outside in, as it is already used for some optical storage media. Magnetic storage media, on the other hand, normally comprise circular, concentric tracks.

The data itself on the track is subdivided into storage blocks, i.e. frames, each equal in length, containing equal amounts of information. Each frame has a dedicated layout depending on the type of optical storage media (CD, DVD). Such a frame always contains the user data symbols itself but also data for synchronization, merging data between data symbols and error correction.

The format in which audio information is stored on a CD is known as the "Red Book" standard, which builds the specification for CDs. The so called "Yellow Book" standard, which builds the specification for CD-ROMs, is typically as a format for a CD-ROM. The Yellow Book format is similar to the Red Book format in many respects, but replacing the audio information by computer data. Besides the Red Book and Yellow Book standard there exist many more standards/specifications developed for optical storage media covering audio data, computer data, video data and combinations of these information, e.g. the Book A, Book D, and Book E standards for DVDs.

As mentioned above, the signal on such an optical record carrier itself is asynchronous, which means that in the decoding process synchronization and timing information has to be taken from the signal.

Due to the nature of such record carriers copies can be made easily. To cope with this situation, there exist various copy protection schemes which prevent unauthorized access with the help of keys or passwords stored on the respective record carrier itself. Further, there exist methods which secure an optical disc with the help of stored invalid information which gets repaired during the copy process so that an application program can determine whether it is stored on an original or on a copy based on the presence or absence of this invalid information.

Another approach is described in the European Patent Application 02 795 240.7, which describes the use of latency information to provide a copy protection mechanism. The central feature described in that application is the usage of latency information for coding of additional information in a record medium. This additional information, which gets embossed in the record medium, might be used for verification purposes in that only storage media with the correct latency information are judged to be authentic or might be decoded in a proper way. This scheme is successful, since copies do generally not show the embossed latency information.

However, the latency information embossed in such a record medium can be spied-out and the copy protection mechanism might be overcome by emulating corresponding latencies of the read data with special software that is provided between the reading device, which reads a copy that does not carry the latency information, and the computer process that performs the verification. Further, since recorders for optical record media get more and more sophisticated, the possibility of also copying the spied-out latency information to an optical record carrier might also exist.

Therefore, it is an object underlying the present invention to provide an improved copy protection system that overcomes the disadvantages set-out above, i.e. a record medium which allows an improved copy protection, a recordable record medium which supports the improved copy protection, an emulator for a recordable or non-recordable record medium which supports the improved copy protection, a method for producing a recordable or non-recordable record medium which supports the improved copy protection, and a method for verifying a recordable or non-recordable record medium which shows the improved copy protection.

The record medium according to the present invention is defined in independent claim 1, a recordable or rewriteable record medium according to the present invention is defined in independent claim 7, an emulator for a (recordable or rewriteable or non-recordable or non-rewriteable) record medium according to the present invention is defined in independent claim 10, a method for producing a (recordable or rewriteable or non-recordable or non-rewriteable) record medium and a method for verifying a (recordable or rewriteable or non-recordable or non-rewriteable) record medium. Preferred embodiments thereof are respectively defined in the respective following sub-claims. Further, computer program products, and a record medium with a computer program product.

Similar to the above-identified European Patent Application of the Applicant, the present invention is also based on the usage of latency information for coding of additional information in a record medium so that this additional information which gets embossed in the record medium might be used for verification purposes in that only storage media with the correct latency information are judged to be authentic or might be decoded in a proper way. However, the central feature of the present invention is that this additional information cannot be spied-out from an original record medium, since the variations of the latency from the production standard (in the following also just referred to as standard) are so small that they are not derivable when trying to spy-out latencies of single storage areas, i.e. the latency variations lie within the measurement noise when measuring the latencies of storage areas with an reading device used for accessing the record medium.

The present invention enables the distinguishing of an original record medium from a copied one, since the latency variations according to the present invention can be detected when considering the whole pattern of embossed latency variations of a part thereof, which might be determined in advance, and not only the latency measurement of a single storage area. The detection of the latency variations according to the present invention is performed with a correlation, preferably a linear correlation, of the measured latencies with the known variations, preferably based on a key that represents the known variations. The key might be chosen randomly (or pseudo-randomly) or might be chosen to comprise additional information used by a program that is stored on the record medium according to the present invention. Further, the key might also be used to encode the program data that is stored on the record medium according to the present invention.

The latency variation respectively embossed into one of said storage areas might lie within or outside the allowed production deviations of the record medium, as long as the respective production standard for the record medium is used to define a corresponding latency. An example is that according to the CD specification line speeds of 1.2 to 1.4 m/s are allowed. The production standard then uses one line speed value of this range or even a value slightly outside this range and keeps this line speed value more or less constant. The accuracy of this more or less constant line speed value depends on the very high accuracy of the production machines. Generally, it can be said that the value is constant for constant conditions during the production, i.e. the used line speed value of one CD will be constant; however, if the same CD is produced one day later, another constant line speed value might be generated although the same settings for the production machine are used, since there are different environmental conditions like temperature and humidity. For DVDs the allowed production deviations of the line speed according to the specification are 0.5% peak to peak of 3.49 m/s, e.g. −0.1% to +0.4% of 3.49 m/s, for single layer DVDs and 0.5% peak to peak of 3.84 m/s for double layer DVDS.

The line speed value of the production standard can be outside the range allowed according to the specification of the record medium, e.g. the CD specification, as long as it is secured that the used reading devices have no problems in accessing the produced record media, e.g. CDs or DVDs. The latency variations according to the present invention applied in the CD production have then preferably a maximum amplitude of ±0.5% of the chosen line speed value, e.g. ±0.5% of a line speed value in the range [1.2, 1.4]m/s. For DVDs, the latency variations according to the present invention applied in the CD production have then preferably a maximum amplitude of ±0.33% of 3.49 m/s for single layer DVDs and ±0.33% of 3.84 m/s for double layer DVDs. Preferably, the line speed variations according to the present invention are determined so that the mean value is the chosen line speed value of the production standard.

According to the present invention latency is the waiting time from the request of data to the receiving of the requested data, e.g. the access time in case of a record medium which is accessed with the help of mechanical devices. It has to be noted that the latency measurement is an indirect way to measure an altered line speed. Such an indirect way is necessary, since it is not possible to directly measure the line speed (or the length of the pits and lands) of a record medium with a general purpose accessing device (of course, it is possible to directly measure the length of the pits and lands when using an appropriate measuring device, e.g. a microscope). Therefore, the central feature of the present invention to include/indicate/emulate/determine and produce/verify a pattern of storage areas with altered latencies that are respectively altered such that the respective alteration of the latency of a storage area lies within a measurement noise of latency measurements in respect to the standard latency of said storage area when the measurement is performed with a reading device for accessing said record medium is equivalent to any measures to achieve such a latency alteration, e.g. to the feature to include/indicate/emulate/determine and produce/verify a pattern of storage areas with altered length of the pits and lands that are respectively altered such that the respective alteration of the length of the pits and lands of a storage area lies within a measurement noise of pit and land length measurements in respect to the standard length of the pits and lands of said storage area when the measurement is performed with a reading device for accessing said record medium. Generally, the latency, which can be measured by observing the needed access times for given conditions, might also include alterations due to the operating system of the accessing device (e.g. including a computer to which a CD/DVD drive is attached or the operating system of the computer). Since such alterations due to the operating system show generally a noise like behaviour, the latency variations embossed on the record medium according to the present invention can still be observed.

According to the present invention, a reading or accessing device for accessing the record medium is a general purpose consumer accessing device, e.g. in case of a CD or DVD this might be a normal consumer CD or DVD player or a computer CD/DVD drive. These "low cost" devices have good capabilities in accessing the record media, but are not designed to have constant or highly reproducible latency characteristics during the access. This fact enables to hide the latency variations embossed into the single storage areas of the record medium according to the present invention while still being able to verify the record medium by comparing the pattern of storage areas with altered latencies with the known latency alterations.

According to the present invention, the latency of a pattern of storage areas gets preferably changed e.g. by altering the line speed of optical, magnetic or magneto-optical storage media (line speed modulation) so that an achieved latency and synchronization properties are still within a specification of said storage media or just slightly outside said specification so that all accessing devices working according to the specification or the majority thereof are able to access the respective storage medium without problems, i.e. the latency of each particular storage area that shows an altered latency is not changed to be recognizable different to the corresponding (production) standard latency that is obtained when the chosen line speed value is not changed or modulated. However, as stated above, when observing the whole pattern of storage areas with altered latencies, a verification of the storage medium is possible.

In case the record medium according to the present invention is copied, the content is stored in a 1:1 manner, but the record medium carrying the copied content will show different latencies than the original record medium according to the present invention and therefore is clearly distinguishable and recognizable as a copy. This difference of the copied record medium to the original record medium (carrying the pattern of storage areas with altered latencies) results from the fact that normal consumer recorders for such record media do not allow to emboss a latency variation. Even in case this would be allowed by such recorders, the fact that these consumer devices are "low cost" devices prevents the reproduction of the latency variations, since the needed accuracy to record the latency variations, e.g. the needed very small line speed variations, cannot be achieved with these devices. This difficulty in recording the record medium according to the present invention with a low cost consumer device exists additionally to the impossibility to spy-out the latency variations according to the present invention with a consumer accessing device. Therefore, even in case it would be possible and a copy of a record medium according to the present invention would be made, the copy includes the read latencies, i.e. the latency variations according to the present invention and the measurement noise, and the production noise that is generated during the production of the copy. Therefore, the latency variations according to the present invention are even smaller in comparison to the noise that results during reading the copy. This fact allows to distinguish even such a "direct" copy (which is currently not producible with consumer devices) from an original. Further, with higher generations of copies, i.e. copies of copies of copies . . . , the noise will completely hide the variations embossed according to the present invention so that these variations can even not be recognized with direct measurements thereof, e.g. with a microscope. The production according to the present invention—on the other hand—is no problem, since it is performed with "high end" production machines that do have a very high accuracy to allow the production of the very small latency variations according to the present invention in a stable and consistent manner and additionally the production according to the present invention is based on the knowledge of the latency variations to be embossed.

The record medium comprising storage areas with respective corresponding standard latencies, wherein latency is the waiting time from the request of data stored in a storage area to the receiving of the requested data, and wherein a respective latency of at least a part of said storage areas is altered in respect to the respective corresponding standard latency, according to the present invention shows the characteristic that a pattern of storage areas with altered latencies that are respectively altered such that the respective alteration of the latency of a storage area lies within a measurement noise of latency measurements in respect to the standard latency of said storage area when the measurement is performed with a reading device for accessing said record medium.

Correspondingly, a recordable or rewriteable record medium, comprising pre-formatted recording density information to obtain storage areas with respective corresponding standard latencies after recording data onto the record medium, wherein latency is the waiting time from the request of data stored in a storage area to the receiving of the requested data, wherein the pre-formatted recording density information indicates that a respective latency of at least a part of said different storage areas is altered in respect to a respective corresponding standard latency, according to the present invention shows the characteristic that said pre-formatted recording density information indicates a pattern of storage areas with altered latencies that are respectively altered such that the respective alteration of the latency of a storage area lies within a measurement noise of latency measurements in respect to the standard latency of said storage area when the measurement is performed with a reading device for accessing said record medium.

Therewith, the record medium according to the present invention might generally show one of the above two possibilities, namely an actual alteration of latencies in a pattern of storage areas in respect to normally, i.e. according to the standard production used latencies, e.g. on basis of a change, e.g. modulation, of the normally used line speed with which data is recorded on an rotating recording medium, or an indicator that is recorded onto a recordable or rewritable record medium and that leads to an alteration of latencies in a pattern of storage areas in respect to normally, i.e. according to the standard production used latencies, e.g. on basis of a change, e.g. modulation, of the normally used line speed with which data is recorded on an rotating recording medium by modulating the frequency information that is recorded in the pre-groove and used to achieve the normally used line-speed during the actual recording of the data. Therefore, generally, the record medium according to the present invention might be a read-only record medium, or a recordable or rewriteable record medium.

Further correspondingly, an emulator for a record medium comprising storage areas with respective corresponding standard latencies, wherein latency is the waiting time from the request of data stored in a storage area to the receiving of the requested data, and wherein a respective latency of at least a part of said storage areas is emulated to be altered in respect to the respective corresponding standard latency, according to the present invention shows the characteristic that a respective latency of said different storage areas gets emulated to show a pattern of storage areas with altered latencies that are respectively altered such that the respective alteration of the latency of a storage area lies within a measurement noise of latency measurements in respect to the standard latency of said storage area when the measurement is performed with a reading device for accessing said record medium.

Therewith, using conventional access restriction techniques, such as simply denying the access to a record medium in case it cannot be verified that it has a predetermined pattern of latency variations embossed thereon, it can be secured that only original record media are used.

According to a preferred embodiment of the record medium according to the present invention said record medium is preferably an optical or a magneto-optical record carrier, in particular of a CD or DVD type, comprising memory blocks of a predetermined amount of storage capacity, in particular storage sectors or frames, as said storage areas, wherein said respective corresponding standard latencies are determined based on a density of bits written in said memory blocks according to a standard procedure for writing the bits into said memory blocks, and said altered latencies of said memory blocks forming said pattern are shorter or longer latencies than said respective corresponding standard latencies achieved by writing the bits with grater or lesser density into the respective memory blocks.

The standard procedure for writing the bits into said memory blocks includes the setting on the velocity of the disc during recording, i.e. the frequency of spindle turns of the recorder, and the clock of the bits, i.e. the pits and lands, to be written onto the disc, in a more or less ideal way; however, usually as good as possible to satisfy the specification of the record medium and to achieve the best possible performance in respect to accessibility of the record medium. In this sense, the disc also includes a master from which a stamper is performed to actually produce optical discs, e.g. in an injection moulding process. Generally for optical recording media, the latency is dependent from the recording line speed. CDs and CD-ROMs as well as DVDs and DVD ROMs are generally recorded so that the recording line speed is constant and independent from the recording position. The recording line speed is dependent from two parameters, namely 1) the rotation speed of the medium, i.e. the tracking linear velocity, and 2) the recording signal clock. CLV (constant linear velocity) recording refers to a recording method where the rotation speed is varied and the signal clock is constant in order to achieve constant recording line speed, whereas CAV (constant angular velocity) recording refers to a recording method where the rotation speed is constant and the signal clock is varied in order to achieve constant recording line speed.

As an example, during a normal production, the line speed according to the specification for a CD is chosen in the range of [1.2, 1.4]m/s. Therefore, for CLV recording, the signal clock is set to 4 321 800 Bit per second and the rotation speed in varied in the range of approximately 600 turns per minute and approximately 200 turns per minute. The production based on these usually used values would then result in corresponding standard latencies. The variations of the line speed according to a preferred embodiment of the present invention are achieved by modulating the signal clock in the range of 4 321 800 Bit per second ±0.5% and keeping the rotation speed as in the normal standard production. As a second example, during a normal production, the line speed according to the specification for a DVD is 3.49 m/s for single layer and 3.84 m/s for double layer. Therefore, for CLV recording, the signal clock is set to 26 000 000 Bit per second and the rotation speed in varied in the range of approximately 1300 turns per minute and approximately 433 turns per minute. The production based on these usually used values would then result in corresponding standard latencies. The variations of the line speed according to a preferred embodiment of the present invention are achieved by modulating the signal clock in the range of 26 000 000 Bit per second ±0.33% and keeping the rotation speed as in the normal standard production.

The writing of the bits with grater or lesser density into the respective memory blocks leads to a physical change of the length of the memory blocks with altered latency. This physical change leads to a longer or shorter time needed to read the data within the memory block, since the signal clock is not adapted accordingly. However, the deviations of the latency that are embossed onto the record medium according to the present invention are not derivable when observing the latency of a single storage area, since the individual variation lies within the measurement noise of an accessing device, i.e. the latency measurement of a storage area with latency alteration according to the present invention and the latency measurement of a storage area without such a latency alteration cannot be distinguished, since the latency deviations are so small that they are overlaid by the noise. Only comparing the pattern of latency variations (or a part thereof that is big enough, which is actually dependent on the maximum amplitude of the variation) with the known latency variations allows a verification of the record medium.

Although the variations of the latencies according to the present invention, i.e. the variation of the density of the pits and lands within one memory block, is within the measurement noise to detect the latencies with a usual accessing device, the pattern of memory blocks with varied latencies is embossed onto the record medium additionally to the production variations. As stated above and further elucidated below, when knowing the pattern of memory blocks with the latency variations and the respective variations, it is possible to verify the record medium.

According to the preferred embodiment of the record medium according to the present invention said shorter and longer latencies might be achieved on basis of line speed variations, wherein said shorter latencies are achieved by writing the bits within a corresponding memory block in a higher density and longer latencies are achieved by writing the bits within a corresponding memory block in a lower density.

Further alternatively or additionally, according to the preferred embodiment of the record medium according to the present invention said optical or a magneto-optical record carrier is a read-only record carrier, or a recordable or rewriteable record carrier, e.g. all kinds of CDs (e.g. CD, CD-ROM, CD-R, CD-RW) or all kinds of DVDs (e.g. DVD, DVD-ROM, DVD-R, DVD+R, DVD+R9, DVD+RW, DVD-RW).

The recordable or rewriteable record medium according to a further aspect of the present invention is preferably an optical or a magneto-optical record carrier, in particular of a CD or DVD type, and said pre-formatted recording density information is a frequency information written to the pre-groove of the record medium, wherein said record medium comprises memory blocks of a predetermined amount of storage capacity, in particular storage sectors or frames, as said storage areas, wherein said respective corresponding standard latencies are achieved when said frequency information indicates a density of bits to be written into said memory blocks according to a standard procedure for writing the bits into said memory blocks, and said altered latencies of said memory blocks forming said pattern are shorter or longer latencies than said respective corresponding standard latencies achieved by writing the bits with grater or lesser density into the memory blocks based on an altered frequency information.

Further preferably, the recordable or rewriteable record medium according to the further aspect of the present invention shows the features of a record medium according to the present invention as indicated above.

Preferably, in the record medium or the recordable or rewriteable record medium according to the present invention, said pattern of storage areas with alterations of their respective latency is achieved by modulating the standard latencies of the pattern of storage areas based on a key. Modulation in this sense means increasing or decreasing the standard latency of the storage areas belonging to the pattern in an amount corresponding to the key or to a part of the key, e.g. one number of the key for each storage area or each (consecutive) number of storage areas.

Further preferably, said key is generated on basis of a pseudo-random process with a predetermined initialization number, i.e. seed. This initialization number and/or the pseudo-random process are preferably kept secret so that it is not possible to easily rebuild the key according to the present invention.

Alternatively or additionally further preferably, said key is a sequence of numbers having a Gaussian distribution that is generated on basis of a pseudo-random process, wherein each of the sequence of numbers is used to alter the latency of at least one predetermined storage area. This usage of a Gaussian distribution is a particular preferred form of the latency alteration according to the present invention, since in this case the latency variations have a noise-like behaviour and therefore the detection of the latency variations (when not knowing them, i.e. when trying to spy-out the latency variations) is impossible even with high end accessing devices (under consideration of available processing power and needed time to find out the latency deviations). Of course, also other distributions that are similar to the measurement noise can be used, since these distributions have an equivalent behaviour in respect to the present invention. Therefore, the term "Gaussian distribution" as used in this specification also stands for other comparable distributions; however the identified Gaussian distribution is particularly preferred due to its good reproducing of the measurement noise. In case the Gaussian distribution is used, preferably the above mentioned ±0.5% variation of the line speed for CDs or the above mentioned ±0.33% variation of the line speed for DVDs that is used for the production is equivalent to 2.5 standard deviations ($2.5\sigma$). Further, the line speed variations according to the present invention are preferably limited to be within this range of $2.5\sigma$, i.e. no line speed variations outside the above mentioned ±0.5% variation of the line speed for CDs or the above mentioned ±0.33% variation of the line speed for DVDs are allowed. This can be achieved by simply reducing values outside this range to the maximum allowed values.

Preferably, in the record medium or the recordable or rewriteable record medium according to the present invention, a predetermined number of consecutive storage areas within said pattern of storage areas have the same altered latency.

The emulator for a record medium comprising storage areas with respective corresponding standard latencies, wherein latency is the waiting time from the request of data stored in a storage area to the receiving of the requested data, and wherein a respective latency of at least a part of said storage areas is emulated to be altered in respect to the respective corresponding standard latency, according to the present invention emulates a respective latency of said different storage areas to show a pattern of storage areas with altered latencies that are respectively altered such that the respective alteration of the latency of a storage area lies within a measurement noise of latency measurements in respect to the standard latency of said storage area when the measurement is performed with a reading device for accessing said record medium, wherein the emulation is based on a key defining the alterations of the respective latency of the pattern of storage areas in respect to their standard latencies.

The emulator according to the present invention needs the key (or—of course—the seed and the algorithm used to generate said key) to emulate the record medium according to the present invention, since it is not possible to spy-out the characteristics of the authentication signature, i.e. the pattern of storage areas with altered latencies or a part thereof and the alterations of the latencies of the individual storage areas, from the access behaviour of the record medium. Also, the above discussed effect that results when a direct copy of the record medium according to the present invention would be possible is also valid for an emulator that works on basis of a direct copy and the latencies measured for the original, since the emulator adds the measured latency variations of the original, which include the latency alterations embossed according to the present invention and the measurement noise, and latency variations resulting from the execution of the emulator itself, e.g. due to the operating system and the load on the processor that executes the emulator. Therewith, also in this case the additional noise "covers" the latency variations according to the present invention more than the measurement noise that results from accessing the original. This leads to the result that such an emulation is also distinguishable from an original (e.g. by properly choosing the threshold value for the comparison of the key and the measured/emulated latencies).

Preferably, an emulator according to the present invention emulates a record medium according to the present invention and all its features as indicated above.

A first computer program product according to the present invention comprises computer program means embodying the emulator according to the present invention as described above when being executed on a computer, digital signal processor, or the like.

The method for producing a record medium or recording data on a record medium, wherein said method comprises to produce or indicate different storage areas with respective corresponding latencies on said record medium, wherein latency is the waiting time from the request of data stored in a storage area to the receiving of the requested data, and wherein a respective latency of at least a part of said different storage areas is altered in respect to a respective corresponding standard latency, according to the present invention comprises the step of determining a pattern of storage areas to be produced or indicated that have altered latencies and respectively altering the latencies of these storage areas such that the respective alteration of the latency of a storage area lies within a measurement noise of latency measurements in respect to the standard latency of said storage area when the measurement is performed with a reading device for accessing said record medium.

According to the present invention recording is to be understood in the sense of writing a recording medium, e.g. with a CD recorder or writer, or with a control circuit for semiconductor memories, and also in the sense of producing a record medium, e.g. an optical record medium such as a CD or a DVD on basis of an injection moulding process, since for this process a stamper is produced based on a master that is made by recording the data onto a master disc.

As also set out above, the key feature of the present invention is that a pattern of individually set latencies that deviate minimally from the standard latency (as it results from the production with the chosen line speed value) is embossed on the record medium according to the present invention. This pattern, which might consist of a predetermined number of consecutive storage areas, e.g. memory blocks or storage sectors, which have different set latencies, can be identified when knowing the characteristic of this pattern, e.g. the number of storage areas and their positional relation to each other and the respective latency alteration, e.g. based on the modulation value that was used to create the altered latency. Preferred is that only one area of consecutive storage areas exist, wherein the latencies deviate differently in these storage areas. In this case the verification method is particularly easy, since only one area of consecutive storage areas has to be examined in respect to the respective latencies of the storage areas.

In the producing and/or recording method according to the present invention, said pattern of storage areas that have altered latencies preferably gets produced or indicated by modulating the standard latencies of the pattern of storage areas based on a key.

This technique has the particular advantage that a nearly normal recording is performed, wherein the signals that are responsible for the latencies get modulated based on a key, e.g. a key that consists of one number for each consecutive predetermined number of consecutive storage areas that have the same altered set latency. This key can then be used to verify whether or not a corresponding latency alteration is embossed on a record medium.

In the producing and/or recording method according to the present invention, said modulating of the standard latencies of the pattern of storage areas based on a key is preferably performed by modulating the density of bits recorded in the storage areas of the pattern of storage areas with said key, or by modulating a frequency information, which gets recorded onto the record carrier in case of a recordable or rewriteable record carrier and which indicates the density of bits to be recorded in the storage areas of the pattern of storage areas, with said key.

Therefore, the method according to the present invention can be applied to record media that have data recorded thereon as well as "empty" recordable or rewritable record media, which only comprise the pre-groove information to enable the recording of data thereon. However, the latency variation according to the present invention can be reflected in the frequency information written into the pre-groove and the absolute position of the pattern of storage areas needs not to be known in advance to determine whether or not the pattern is embossed on the record medium when the characteristic of the pattern, e.g. the relative position of the storage areas, which are included in the pattern, to each other and the latency alteration of each of the storage areas included in the pattern, is known. Therefore, a recordable or rewritable record medium can be easily verified after data is recorded thereon. This technique enables every user with can record data onto a recordable or rewritable record medium to create copy protected data when the key that is used to modulate the pregroove information is known to that user.

In the producing and/or recording method according to the present invention, said key is preferably generated on basis of a pseudo-random process with a predetermined initialization number, i.e. seed.

Such a generation of the key, which preferably consists of one number for each consecutive predetermined number of consecutive storage areas that have the same altered set latency, is of a particular advantage, since the verification can then be based on the (one) initialization number and the known pseudo-random process, i.e. it is not necessary to know the key, which might comprise a huge amount of numbers, e.g. several thousand.

In the producing and/or recording method according to the present invention, said key is preferably generated as a sequence of numbers having a Gaussian distribution on basis of a pseudo-random process, wherein each of the sequence of numbers is used to alter the latency of at least one predetermined storage area.

The usage of a pseudo-random process that generates a sequence of numbers having a Gaussian distribution as said key further enhances that the variations of the latency in respect to the standard latency cannot be easily spied-out from the original record medium that has said pattern of storage areas with said latency variations according to the present invention embossed thereon, since in this case the latency variations do not only have amplitudes corresponding to the measurement noise, but also behave like noise.

In the producing and/or recording method according to the present invention, preferably a predetermined number of consecutive storage areas within said pattern of storage are modulated to have the same altered latency.

Such a modulation that uses the same part of the key, i.e. the same pseudo-random generated number, to alter the latency of (a block of) a predetermined number of consecutive storage areas has the advantage that the detection of the latency variation is enhanced. Such blocks of a predetermined number of consecutive storage areas might be arranged consecutively one behind the other or in any other pattern on the record medium.

In the producing and/or recording method according to the present invention, said step of altering the latencies might be performed by recording format information onto said record medium. In this case, said format information might comprise an information in respect to a density of bits to be recorded onto said record medium. Further preferably, said format information is a frequency information written to the pregroove of the record medium. In this case of a recordable or rewriteable record medium generally two writings are performed for the recording, namely the writing of the pregroove information which among others indicates the recording density or latency information according to which the relative speed of the second writing, namely the writing of data bits to be recorded, is set, and then the writing of data bits to be recorded. On the other hand, it is also possible to set the relative speed of the writing of data bits independently from the recording density or latency information within the pregroove information. Further, in the producing and/or recording method according to the present invention, said recording might be performed by changing a relative speed of writing data bits and rotating the record medium.

The method for verifying a record medium comprising different storage areas with respective corresponding latencies, wherein latency is the waiting time from the request of data to the receiving of the requested data, according to the present invention comprises the step of determining a pattern of storage areas that have altered latencies that are respectively altered such that the respective alteration of the latency of a storage area lies within a measurement noise of latency measurements in respect to the standard latency of said storage area when the measurement is performed with a reading device for accessing said record medium by a correlation process, in particular a linear correlation, in which the latencies of said pattern of storage areas that have altered latencies is correlated with a key used to produce the altered latencies.

This verifying method according to the present invention has the advantage that the measured latencies of the storage areas of the record medium can directly be compared with the key used to generate and emboss the latency variations. The decision whether an original record medium (with the embossed small latency variations according to the key) or whether a copy thereof (which does not have the embossed small latency variations according to the key) is currently verified is then based on the obtained correlation result.

The detection algorithm to detect whether or not a record medium carries the storage areas with altered latencies according to the present invention, i.e. the above verification method, is preferably carried out by the steps of:

choosing a value s randomly in an allowed sector range, i.e. range of sectors (=storage areas in this case) that builds the pattern of storage areas with altered latencies, under the restriction that s_min sectors are available following the sector with number s within the sector range, wherein s_min is the number of sectors needed to have the possibility to obtain a positive verification result, i.e. the minimum number needed for the detection of the alterations of the latencies under observation of their amplitudes;

measure and store the sector access timings beginning with sector s;

perform a correlation of the stored access timings with the key, e.g. the key itself or signature data derived on basis of the key, and continue measuring and storing consecutive access timings until the correlation result is above a first threshold t1 (an original is detected) or s_max sectors are read, wherein s_max is determined by subtracting s from the length, i.e. the number, of the storage areas with altered latencies;

in case that errors occurred or extensive access times are detected, preferably the whole measurement, storing and correlation is repeated;

filtering the stored measurement data to remove spikes, compensate for read errors, and compensate for drive calibration;

apply a post processing to subtract an estimated access time for a given drive/disc from measurements;

perform a correlation of the filtered and post-processed measurement data with the expected key or key derived signature data;

if the correlation result lies above a second threshold t2 an original is detected, otherwise the verification could be retried or a fail of the verification is detected.

The setting of the first threshold t1 larger than the second threshold t2, i.e. t1>t2, allows to short-cut the time-consuming measurement if the correlation result is above the elevated first threshold t1. The second threshold t2 is the detection threshold.

In the verifying method according to the present invention, said key is preferably generated on basis of a pseudo-random process with a predetermined initialization number, i.e. seed, in particular the same pseudo-random process used to generate the key during the production of the record medium.

In the verifying method according to the present invention, said key is preferably generated as a sequence of numbers having a Gaussian distribution on basis of a pseudo-random process, wherein each of the sequence of numbers is used to alter the latency of at least one predetermined storage area, in particular the same pseudo-random process used to generate the key during the production of the record medium.

In the verifying method according to the present invention the latencies of storage areas included in said pattern (and also of other storage areas) might be measured, stored in a table and then be correlated with the key to determine whether or not said record medium is an original.

A second computer program product according to the present invention comprises computer program means adapted to perform the method for producing a record medium or recording data on a record medium and/or the verifying method as described above when being executed on a computer, digital signal processor, or the like.

A record medium writing device applicable to the present invention is adapted for writing data onto a record medium comprising different corresponding standard latencies, wherein latency is the waiting time from the request of data stored in a storage area to the receiving of the requested data, and comprises recording density variation means to alter a respective latency of individual storage areas such that the respective alteration of the latency of a storage area lies within a measurement noise of latency measurements in respect to the standard latency of said storage area when the measurement is performed with a reading device for accessing said record medium.

In such a record medium writing device, said recording density variation means preferably changes the relative speed of writing data bits and rotating the record medium. In this case, said recording density variation means might obtain information for changing the relative speed of writing data bits and rotating the record medium from a pre-formatted recording density information or latency information on the record medium. Alternatively or additionally, said recording density variation means might obtain information for changing the relative speed of writing data bits and rotating the record medium from an external control signal.

Figure 2:
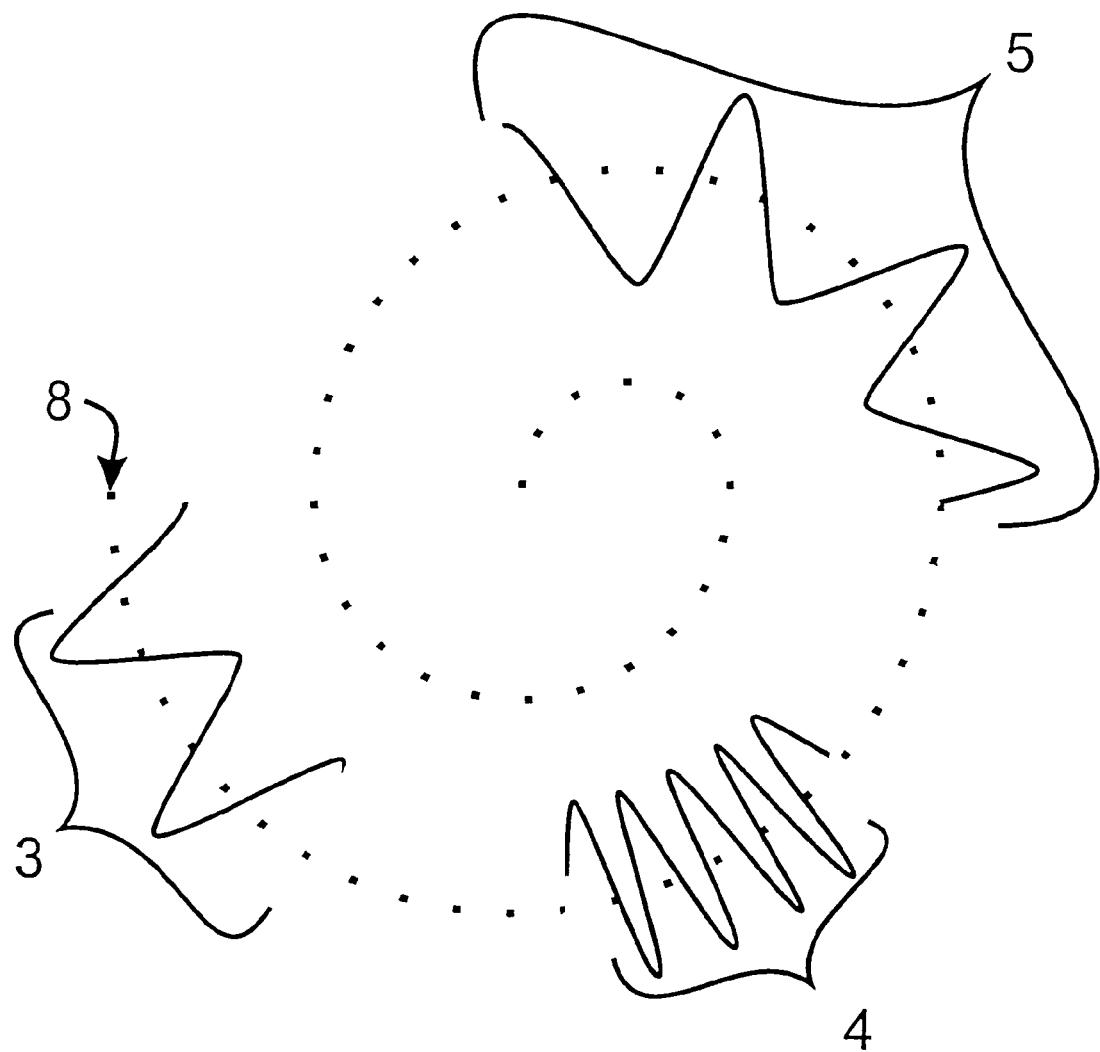
Figure 3:
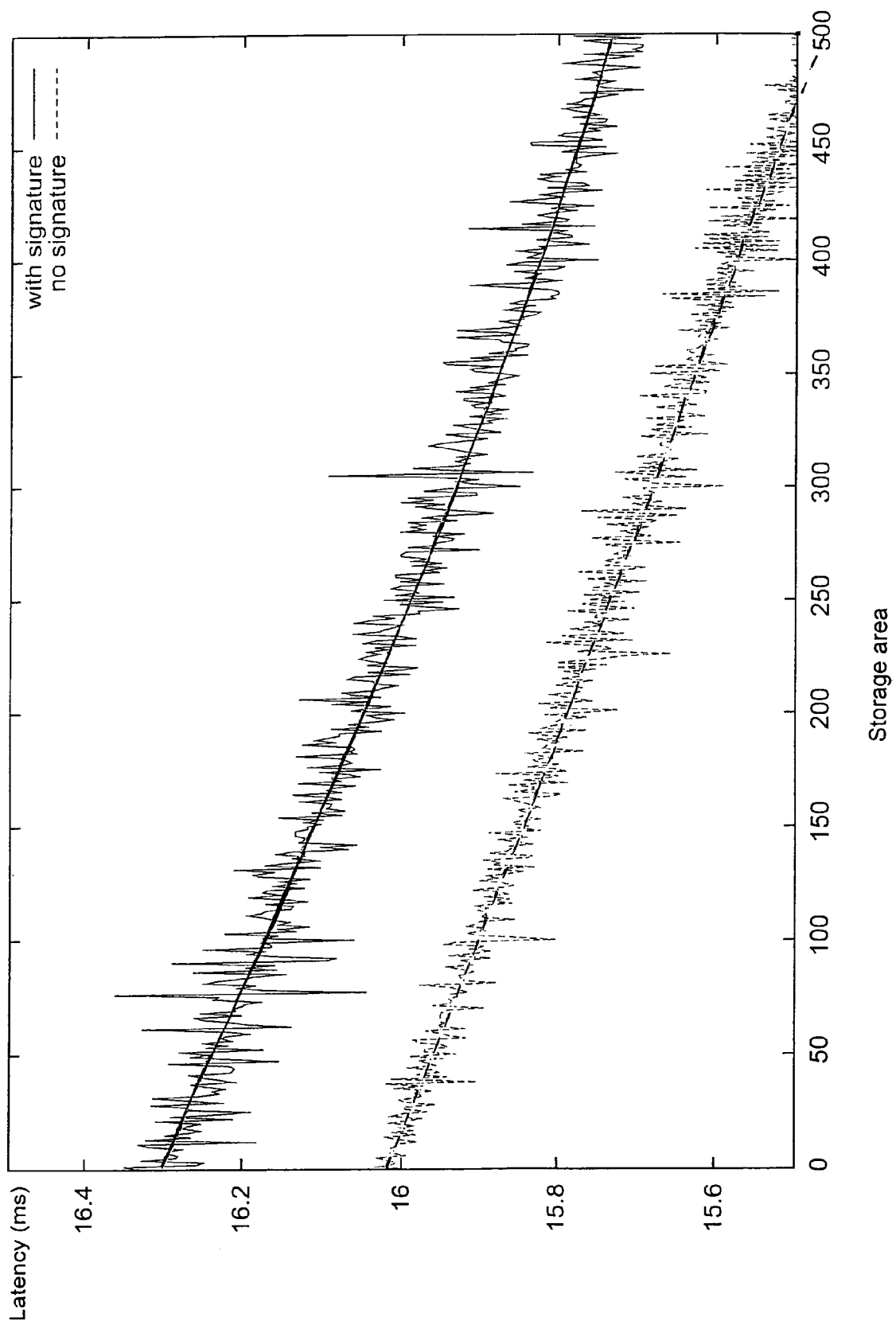
Figure 4:
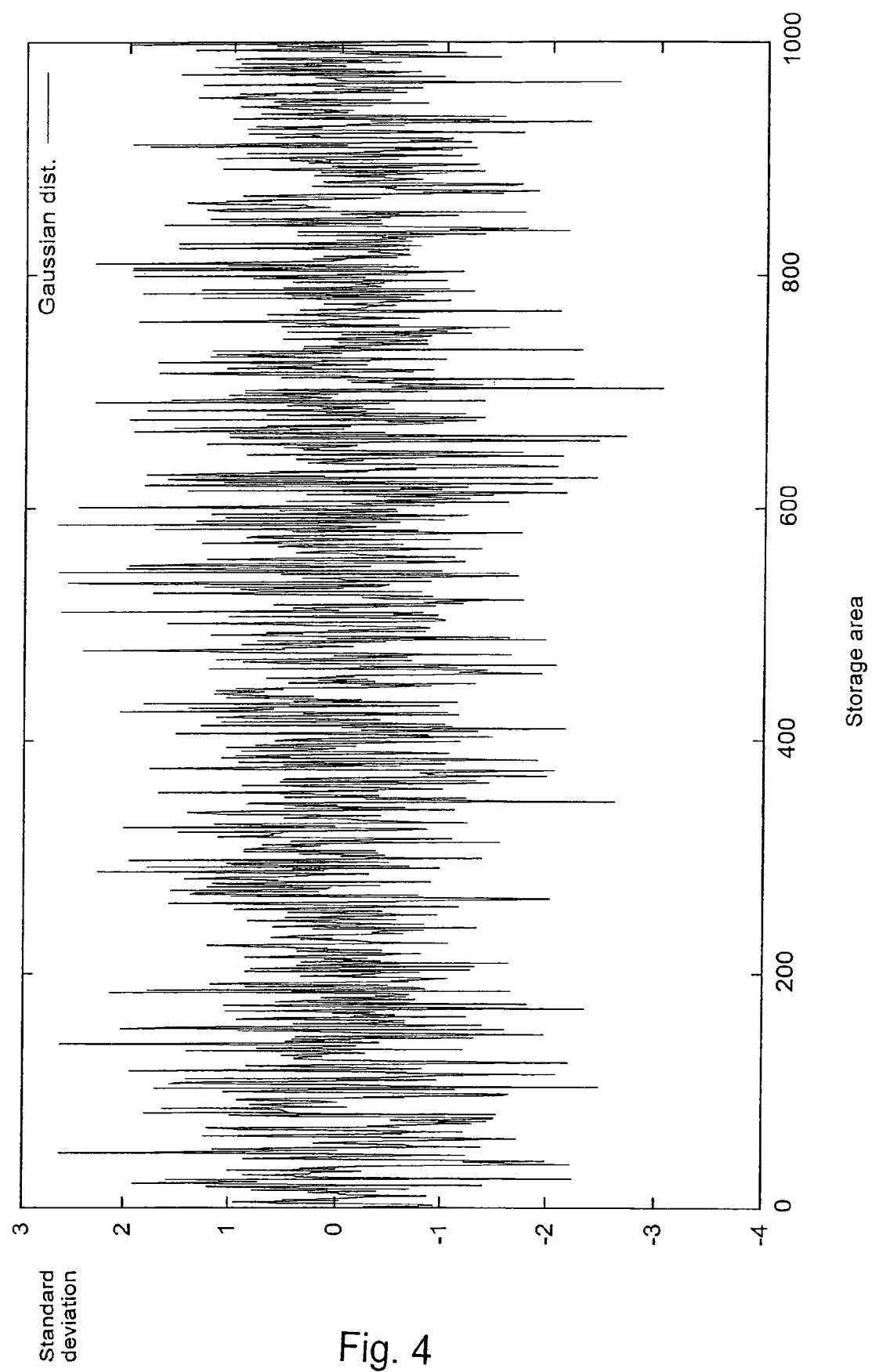
Figure 5:
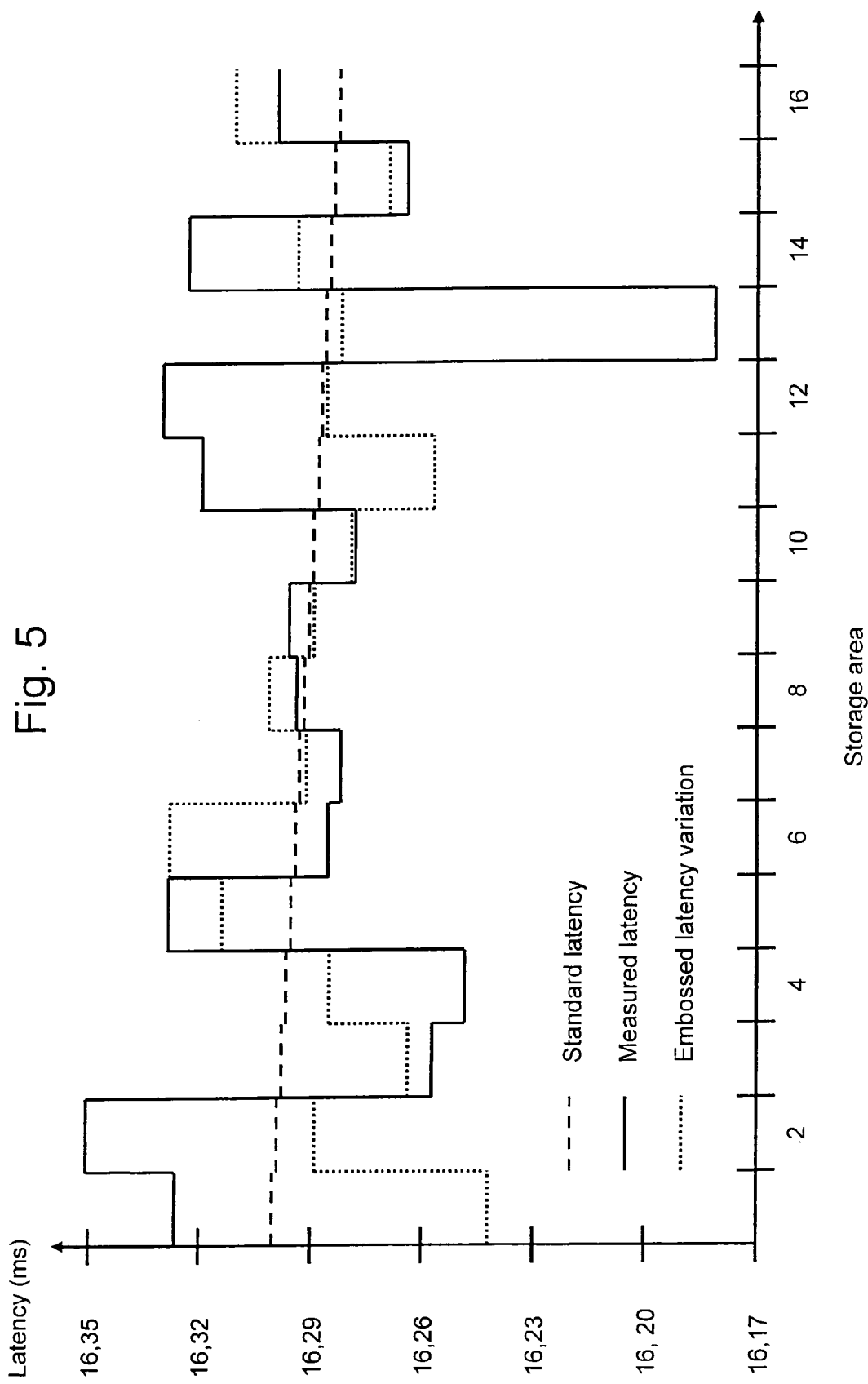
Figure 6:
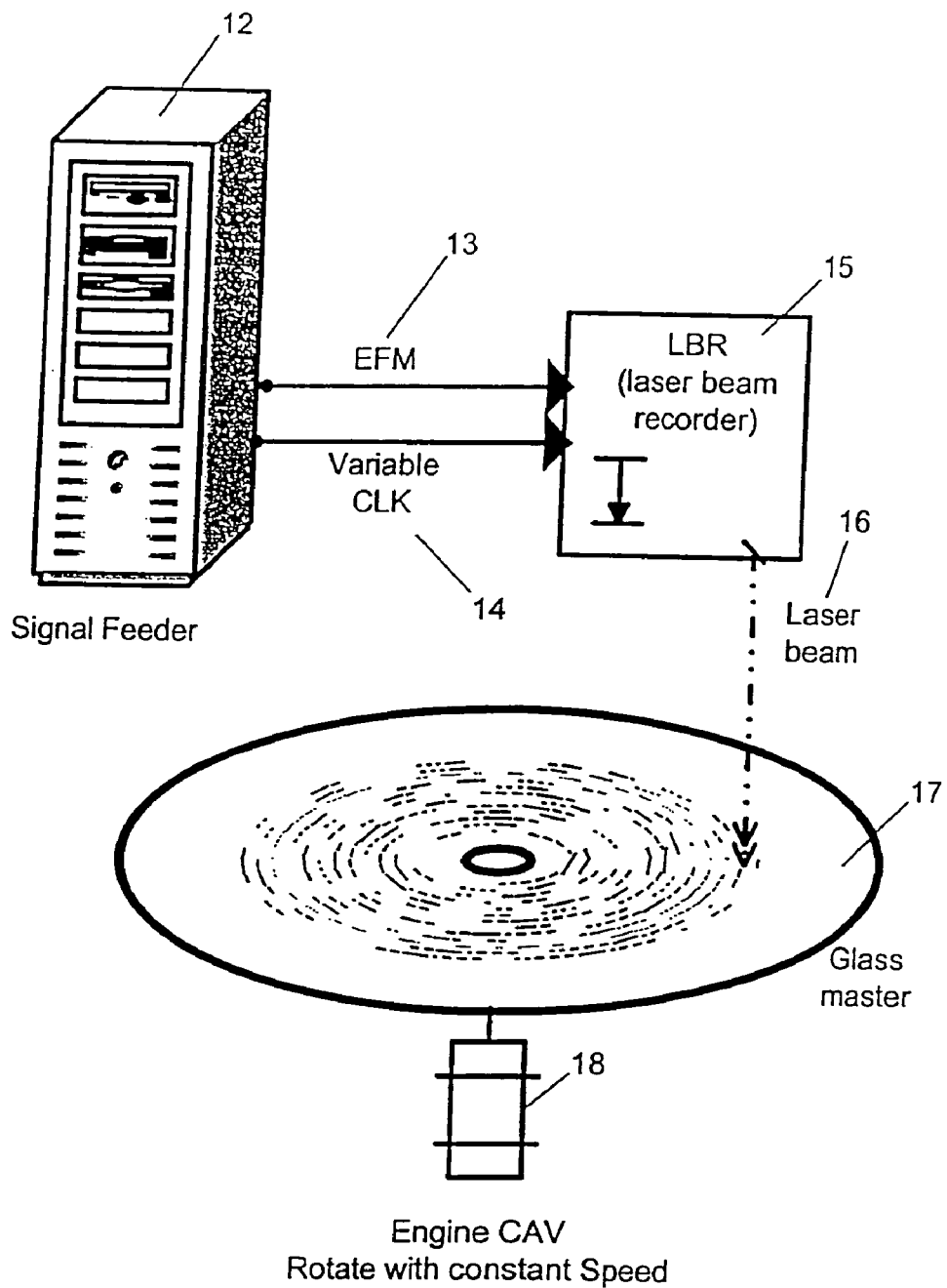
Figure 7:
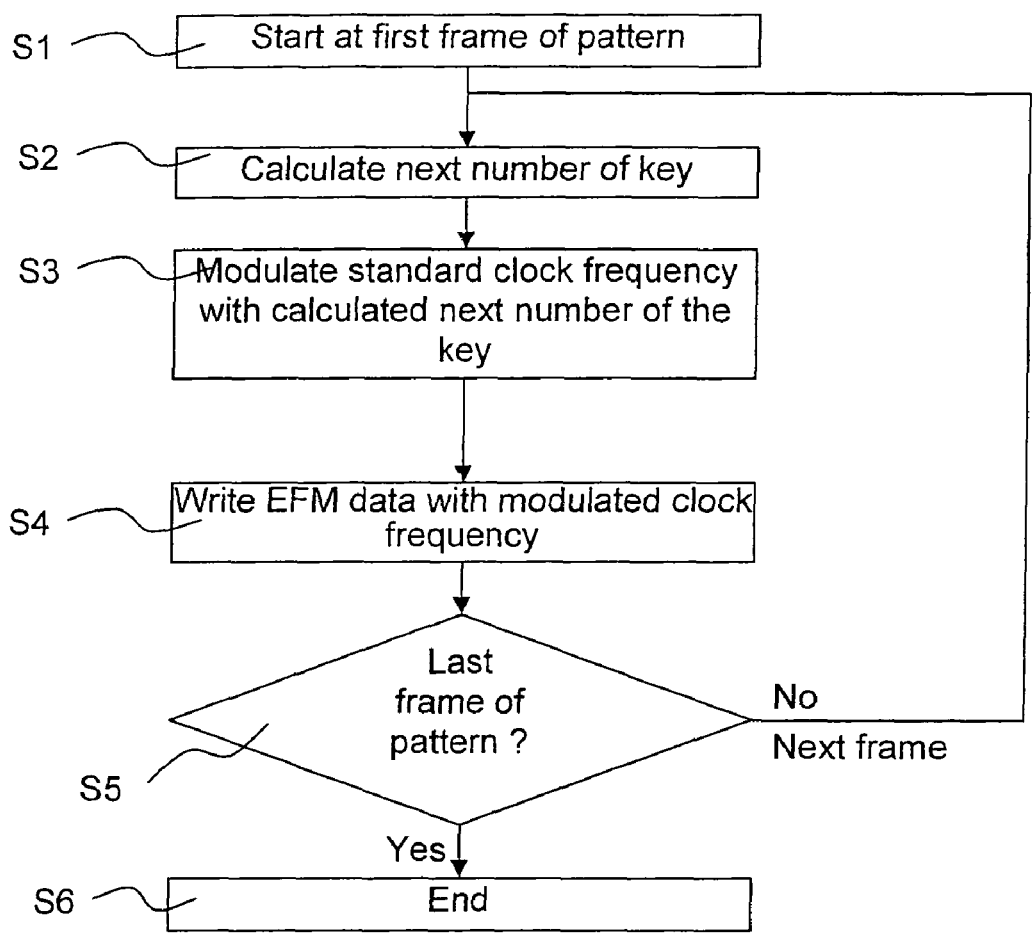
Figure 8:
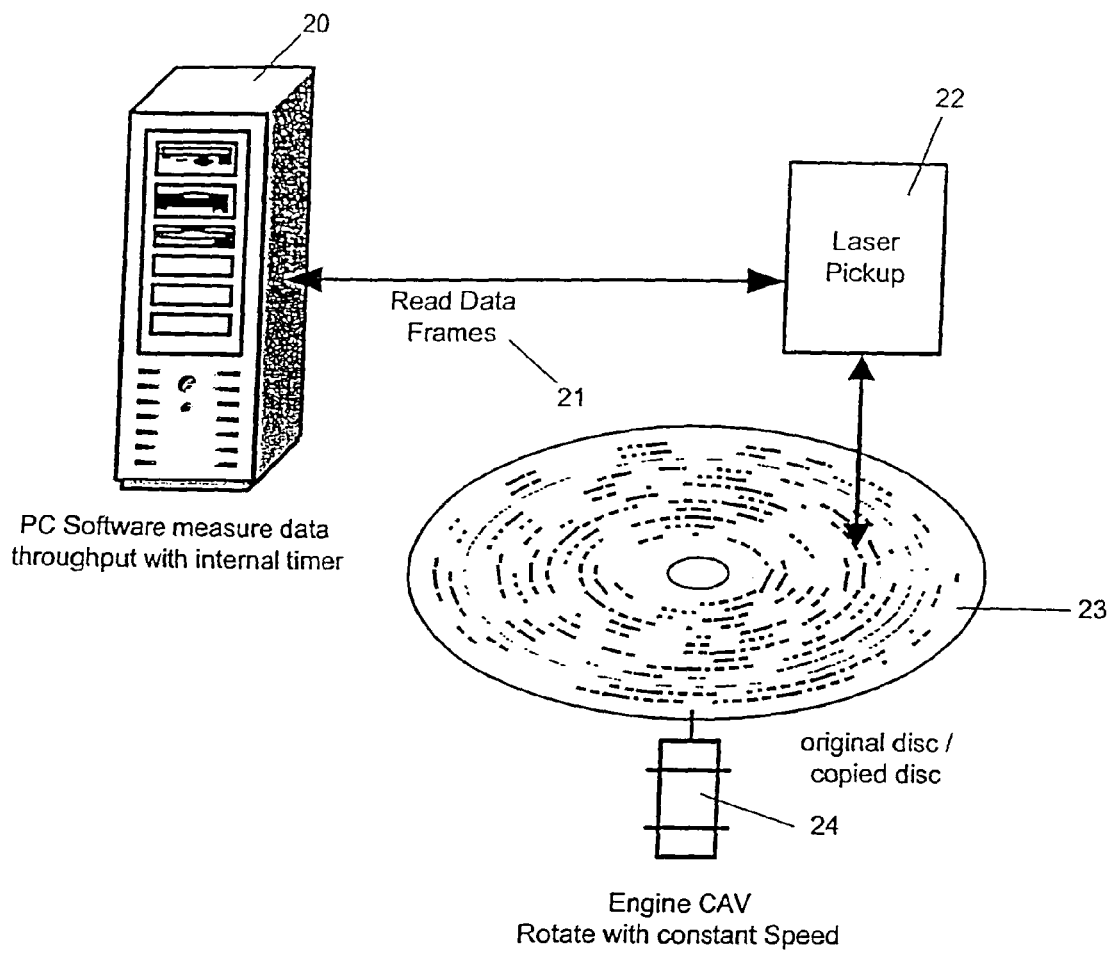
Figure 9:
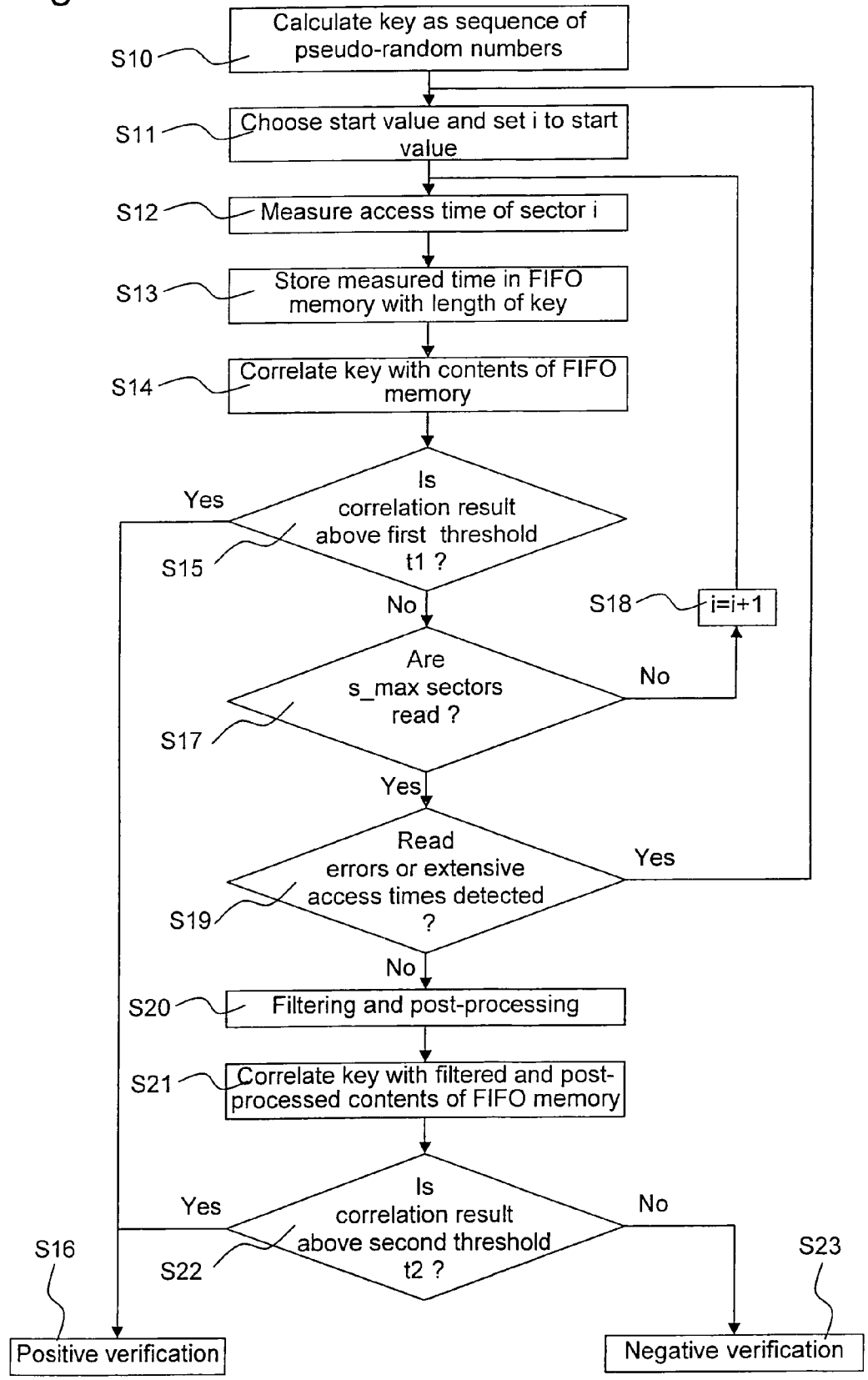
Figure 10:
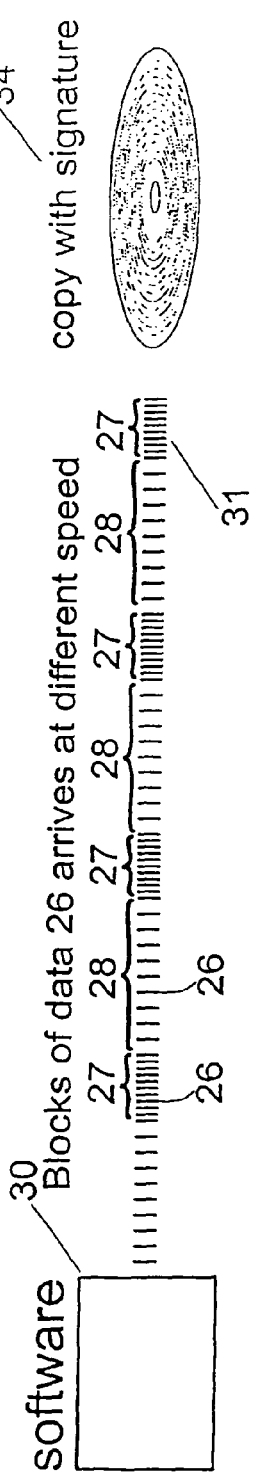
Figure 10:
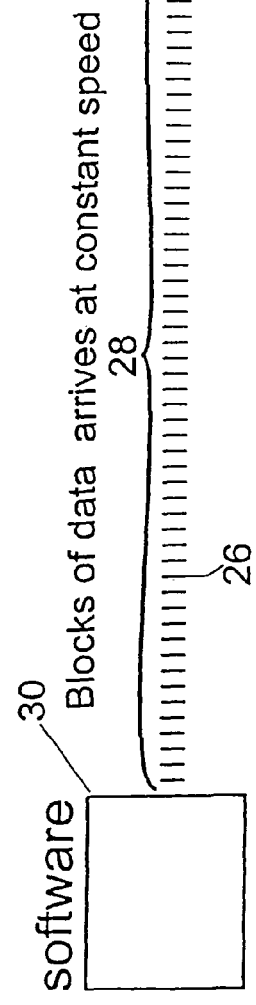
Figure 10:
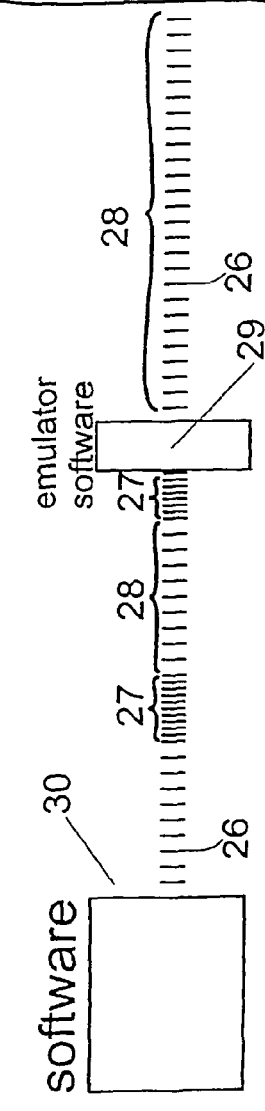
Figure 10:
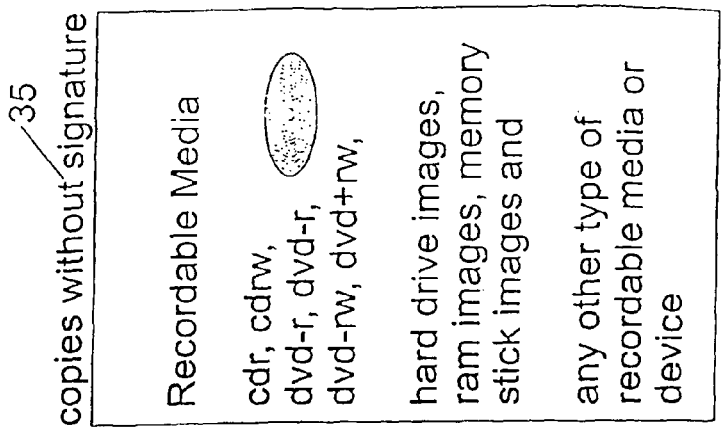

The accompanying figures, which are incorporated in and constitute a part of this specification, illustrate exemplary embodiments of the invention and, together with a general description of the invention given above, and the detailed description of the embodiment given below, serve to explain the principles of the invention, wherein:

FIG. 1 shows a principle view of pits and lands of neighbouring storage areas of a CD according to a first preferred exemplary embodiment of the present invention, FIG. 2 shows a principle view of recording density information pre-formatted as pre-groove information on a CD-R according to a second preferred exemplary embodiment of the present invention, FIG. 3 shows standard latencies of one disc and altered latencies of another comparable disc for an exemplary CD-ROM accessing device, FIG. 4 shows a key to derive the altered latencies according to the present invention as shown in FIG. 3, FIG. 5 shows standard latencies as shown in FIG. 3 in a partial enlarged view together with altered latencies according to the present invention, FIG. 6 shows a functional diagram of an exemplary record medium writing device for producing record media with different latencies, FIG. 7 shows a flowchart of an exemplary procedure to set different latencies executed in a signal feeder of the record medium writing device according to FIG. 6, FIG. 8 shows a functional diagram of an exemplary record medium verifying device for record media with different latencies, FIG. 9 shows a flowchart of an exemplary procedure to verify different latencies executed in a processor of the record medium verifying device according to FIG. 8, and FIG. 10 shows a principle view of an emulator or emulator software emulating the different latencies of a record medium according to the present invention.

FIG. 1 principally shows pits 1 and lands 2 of neighbouring storage areas along a track 8 of a CD, namely the arrangement of pits 1 and lands 2 within a first storage area 3, the arrangement of pits 1 and lands 2 within a second storage area 4, and the arrangement of pits 1 and lands 2 within a third storage area 5. The first storage area 3 shows a normal, i.e. standard, latency for the respective position on a CD, the second storage area 4 shows an altered, here a shortened latency for the respective position on a CD, and the third storage area 5 again shows a normal, i.e. standard, latency for the respective position on a CD. No pits and lands are indicated in the transition regions between the storage areas. FIG. 1 shows this altered latency in a magnified way. According to the present invention in principle an alteration of the latency is performed within all storage areas that belong to a selected pattern of storage areas; however, the variation of the latency according to the present invention in respect to the standard latency is so small that it is not derivable when measuring the latency of a storage area with altered latency. The principle of the present invention is to include small latency variations (so that they cannot be spied-out) into a plurality of storage areas and to "measure" the latency variations of a number of storage areas simultaneously so that a proper distinction between an original record medium having the latency variations embossed thereon and a copied record medium that does not show the latency variations can be made.

Generally, the latencies are derivable from the density with which the pits and lands are formed and from their respective expansion. In case the single bits of information are written to the CD in a shorter time than usual, i.e. the density of pits and land is higher and their expansion is shorter than usual, a predetermined memory block or sector of the CD is accessed in a shorter time than usual. Vice versa, in case the single bits of information are written to the CD in a longer time than usual, i.e. the density of pits and land is lower and their expansion is longer than usual, a predetermined memory block or sector of the CD is accessed in a longer time than usual. However, according to the present invention, the latency variations made are so small that they respectively (for each storage area) are "invisible" within the measurement noise of the accessing device used to measure the latencies. Further, preferably the latency variations among the storage areas that build the pattern are varied so that they also behave like noise.

In case the accessing device very quickly performs a self-synchronization to the more dense and less expanded pits and lands, the latency might be a corresponding standard latency, i.e. similar to the latency of a corresponding CD sector which latency is not altered, but the "change of latency" is derivable from the change of rotation speed of the disc drive. In other words, according to the present invention the relative latency is considered, i.e. the relation of latency in respect to rotation speed. The term latency as used throughout this specification includes this consideration of a deviation of the rotation speed of the disc drive from a corresponding standard rotation speed.

Normally, as is elucidated below, neighbouring storage areas of a CD show only slight variations in respect to their latencies. Further, since according to the present invention, as described in connection with FIG. 1, an alteration in respect to the normally corresponding (production) standard latency is not recognizable on basis of a comparison of the measured latency of a storage area with the normally corresponding standard latency thereof, the latency variations of the original record medium can not be spied-out and the original record medium can only be distinguished from a copy thereof by a "measuring" of the latency variations of a plurality of storage areas. Further, since the altered latencies, e.g. realized on basis of line speed variations, are preferably made according to a Gaussian-distribution around the corresponding standard latencies, i.e. any attempt to spy-out the latency variations, which then are—as a whole—also noise-like, by simply observing a plurality of storage areas will fail, the "measurement" can also not be performed without knowing the key used to generate the latency variations.

Since the altered latencies, e.g. realized on basis of line speed variations, get lost with today available CD-Recorders and CD-Recordables due to the fact that these recorders determine the latency on basis of information pre-formatted to the record medium, e.g. pre-formatted line speed information in the pre-groove of a CD-R, and since the altered latencies cannot be derived by observing the characteristics of the record medium, the copying or emulation of record media secured with the verification scheme according to the present invention is prohibited.

Since a recordable or rewriteable record medium according to the further aspect of the present invention comprises e.g. pre-groove information indicating a varied line speed, recording devices automatically adapt to the varying line speed indicated in the pre-groove and data to be recorded can be secured based on the pre-groove information which is known before the writing or recording process.

The line speed information comprised in the pre-groove information of a recordable or rewriteable CD or DVD is in principle shown in FIG. 2 corresponding to the exemplary CD shown in FIG. 1. The pre-groove information indicates the position of the track 8 along which the data is to be recorded and based on a frequency "wobbled" onto the track position also the line speed information.

FIG. 2 shows that the frequency is low in the first storage area 3, then high in the second storage area 4 to be low again in the third storage area 5. As FIG. 1, also FIG. 4 shows this altered latency in a magnified way, since the variation of the latency according to the present invention in respect to the standard latency is so small that it is not derivable when measuring the latency of a storage area with altered latency (or not observable in any other way).

In contrast to the recordable or rewritable record media, which comprise the latency variations according to the present invention embossed into the frequency information of the pre-groove, for read-only optical record media, the latency information, e.g. the line speed variation, is set during the mastering process.

Of course, not only two different frequencies might be used, as indicated above by low frequency and high frequency, but usually a higher number of frequencies is chosen to enable a higher coding of line speeds, i.e. latency information.

FIG. 3 shows the distribution of standard latency curves of two CD-ROMs (i.e. ideal curves) and the corresponding measurement results read out with an exemplary CD-ROM accessing device over an area of 500 storage areas (i.e. real latency measurement results). The latency distribution might look slightly different with a different accessing device; also, more or less measurement noise might be included in the actually measured values.

In particular, the upper (solid) curve shown in FIG. 3 shows variations of the measured latencies around the standard latency, i.e. that resulting from the chosen line speed during production, which standard latency is continuously decreasing in a nearly linear manner from 16.3 ms for the first measured latency to 15.73 ms to the last measured latency (shown as a bold solid line in the upper solid curve of the measured latencies). Further, the lower (dashed) curve shown in FIG. 3 shows variations of the measured latencies around the standard latency, i.e. that resulting from the chosen line speed during production, which standard latency is continuously decreasing in a nearly linear manner from 16.01 ms for the first measured latency to 15.47 ms to the last measured latency (shown as a bold dashed line in the lower cashed curve of the measured latencies). The difference of both standard latencies, i.e. of the upper bold solid line and the lower bold dashed line results from different production conditions, e.g. both discs might be produced on the same production machine, but on different days with different temperatures and humidity.

The upper solid curve of the actually measured latencies results from latency measurements of storage areas of a disc, which storage areas have altered latencies according to the present invention, and the lower dashed curve of the actually measured latencies results from latency measurements of corresponding storage areas, i.e. at the same position, of a different disc without altered latencies. In other words, the upper curve shows the signature according to the present invention and measurement noise and the lower curve shows only measurement noise.

As can be derived from a comparison of both curves shown in FIG. 3, the slight latency variations according to the present invention can not be derived when observing the single storage areas, since the measurement noise has an amplitude that can be and usually is higher than that of the latency variations according to the present invention. Further, also a special distribution of the introduced latency variations is not derivable by comparing both curves. However, as stated above, when knowing which storage areas have altered latencies and how the latencies are respectively altered, a comparison of the measurement results of a latency measurement of these storage areas (or a part thereof that is large enough) with the known latency variations provides a solid basis for verifying a record medium when the comparison is made with an appropriate technology, such as a linear correlation of the measurement results with the latency variations, e.g. represented by the key used to produce the latency variations.

FIG. 4 shows the key values used to emboss the latencies shown in the upper curve of FIG. 3. In comparison to FIG. 3, which shows storage areas 1 to 500, FIG. 4 shows a longer key, namely for storage areas 1 to 1000. The key is generated by a predetermined pseudo-random process based on a predetermined seed, wherein the pseudo-random process generates pseudo-random values that have a Gaussian distribution, wherein values of ±1 equal to 1 standard deviation (1σ), values of ±2 equal to 2 standard deviations (2σ), . . . , the maximum values output by the algorithm are ±2.5 and other values between ±2.5 correspond in a equivalent relation to the standard deviation as the before mentioned examples do.

FIG. 5 shows the distribution of standard latencies of a CD-ROM as shown in the upper curve of FIG. 3 in a partially enlarged view, namely for the storage areas 1 to 16 in a dashed line, the measured latencies shown in the upper curve of FIG. 3 in a solid line, and the latency variations embossed into these storage areas according to the present invention with a dotted line. In this case the measured latencies respectively include the respectively embossed latency and the respective measurement noise.

The different latencies and the key values corresponding to the latencies respectively embossed into the different storage areas are also shown in table 1 below.

TABLE 1

| Storage area | Standard latency (ms) | Key | Embossed latency (ins) | Measured latency (ins) |
|---|---|---|---|---|
| 1 | 16.3 | −1.604570 | 16.2477 | 16.326935 |
| 2 | 16.29886 | −0.272549 | 16.2899 | 16.350962 |
| 3 | 16.29772 | −0.936727 | 16.2672 | 16.257652 |
| 4 | 16.29658 | −0.787333 | 16.2709 | 16.248713 |
| 5 | 16.29544 | 0.518415 | 16.3123 | 16.328333 |
| 6 | 16.2943 | 0.949113 | 16.3252 | 16.285311 |
| 7 | 16.29316 | −0.044241 | 16.2917 | 16.282236 |
| 8 | 16.29202 | 0.482964 | 16.3078 | 16.293411 |
| 9 | 16.29088 | −0.051279 | 16.2892 | 16.295366 |
| 10 | 16.28974 | −0.277166 | 16.2807 | 16.278326 |
| 11 | 16.2886 | −0.880765 | 16.2599 | 16.319393 |
| 12 | 16.28746 | −0.042220 | 16.2861 | 16.330288 |
| 13 | 16.28632 | −0.111810 | 16.2827 | 16.181107 |
| 14 | 16.28518 | 0.254861 | 16.2935 | 16.323025 |
| 15 | 16.28404 | −0.404236 | 16.2709 | 16.264637 |
| 16 | 16.2829 | 0.770162 | 16.3080 | 16.299000 |

The key, which is shown in FIG. 4 for 1000 storage areas, and the embossed latency have the linear relation that a key value of 0 equals to a deviation of 0.0% of the standard latency for a CD and a key value of ±2.5 (which equals to 2.5 standard deviations, i.e. 2.5σ) equals to a deviation of ±0.5% of the standard latency for a CD.

It can be seen that a spying-out of the respectively embossed latency variation from the measured latency is impossible for the shown 16 storage areas, since the embossed latencies behave like noise as well as the actually measured latencies. However, a correlation of these curves (or—due to the technique of correlation—equivalently a correlation of the measured latency with the key used to emboss the latency variations) results in a correlation result that is higher than a correlation of the embossed latencies with a curve only representing the measurement noise, e.g. the lower measurement curve shown in FIG. 3. Under assumption of the above latency alterations, the correlation result can reliably verify whether or not the latencies of an original are measured with a number of measurements in the order of 1000. Of course, the correlation result gets more reliable when more measurement values are used and vice versa. Further, when the latency alterations are chosen smaller, it follows that a higher number of measurements have to be carried out to verify whether or not the latencies of an original are measured.

The latencies of a specific storage area, e.g. a CD sector or frame, might be derived on basis of a direct measurement of the latency when starting from a predetermined "jump point" to access the respective storage area.

Special record medium accessing devices that are particularly adapted to the present invention might comprise an additional output channel providing latency information. The curves shown in FIG. 3 might be regarded as latency information available at this output.

FIG. 6 shows a functional diagram of an exemplary record medium writing device for producing optical record media with different latencies according to the present invention. A signal feeder 12 supplies an EFM signal 13 as signal to be recorded and a variable clock signal 14 to a laser beam recorder 15. The laser beam recorder 15 emits a laser beam 16 onto a glass master 17 that is rotated with a constant angular velocity by a recorder engine 18. The laser beam 16 is modulated according to the EFM signal 13 and the variable clock signal 14 to record pits and lands corresponding to the EFM signal 13 in relation to the variable clock signal 14 onto the glass master 17, i.e. the variable clock signal 14 determines the length of each respective bit of the recorded EFM signal 13 on the glass master 17. In case the variable clock signal 14 has a higher than usual frequency for a corresponding recording position, the recorded pits and lands will be shortened in respect to their usual length in said position and in case the variable clock signal 14 has a lower than usual frequency for a corresponding recording position, the recorded pits and lands will be lengthened in respect to their usual length in said position.

A writing code or key as shown in FIG. 4 and also in table 1 (in the following referred to as key) within the signal feeder determines a modulation of the standard clock frequency to obtain the variable clock frequency in the shown exemplary record medium writing device. In the shown example each number of the key determines the deviation of the clock frequency from the normal standard clock frequency within one particular data frame, i.e. storage area, to be recorded. The number determines the deviation of the standard clock frequency as mentioned above. Therewith, the numbers of the key directly correspond to the latency deviations embossed on the produced glass master and therewith also on the resulting record media.

FIG. 7 shows a flowchart of an exemplary procedure to set different latencies executed in the signal feeder 12 of the record medium writing device according to FIG. 5. Unless the first storage area of the record medium is included within the pattern of storage areas that have the altered latencies according to the invention, the beginning of the record medium gets recorded with the standard clock frequency. Then, the procedure to set different latencies starts in a first step S1 at the first frame that builds the pattern of storage areas, which—in this case—is a field of successive data frames. Thereafter, in a second step S2 the next number for the key is calculated. As mentioned above, this calculation is preferably performed based on a pseudo-random process with a Gaussian distribution that uses a predetermined initialization number. Every time this pseudo-random process is executed, a new pseudo-random number is output. All output pseudo-random numbers in the output order build the key. In case the same pseudo-random process is executed for the same number of times using the same initialization number, the same key results. In a following third step S3 the standard clock frequency gets modulated with the generated next number of the key, i.e. the standard clock frequency gets reduced or increased in an amount that corresponds to the generated next number of the key. The modulation is performed so that the resulting deviation of the latency lies within the allowed production deviations or even within the measurement noise to measure the latencies of the resulting record medium. In a following fourth step S4 the EFM data gets written with the modulated clock frequency. Thereafter it is checked in a fifth step S5 whether or not the last frame (that builds the pattern of storage areas) was processed. In case the last frame was processed, the procedure continues with a sixth step S6 in which it terminates. In case this is not the case, i.e. a next frame is to be processed, the procedure resumes the second step S2. Unless the last storage area of the record medium is included within the pattern of storage areas that have the altered latencies according to the invention, the end of the record medium gets recorded with the standard clock frequency.

The pattern of storage areas into which the verification signature is embossed needs not to be a field of successive data frames, but can be other predetermined storage areas within the number of storage areas available on the record medium. In this case, storage areas, e.g. data frames as in the above example, that do not belong to the pattern of storage areas with altered latencies are recorded with the corresponding standard clock frequency and the other storage areas are recorded according to the above procedure. Alternatively, the all storage areas of the record medium might be recorded with the above procedure, but the key might get calculated according to an algorithm that outputs key numbers that indicate no deviation, i.e. result in a modulation that does not alter the corresponding standard latency, for the storage areas that do not belong to the pattern of storage areas that have altered latencies.

FIG. 8 shows a functional diagram of an exemplary record medium verifying device for record media with different latencies according to the present invention. A reader engine 24 rotates an original or copied optical disc 23 with a constant angular velocity. A laser pickup 22 reads the data, i.e. the recorded EFM signal, from the disc 23 and supplies the read data frames 21 to an evaluation unit 20, e.g. as in this embodiment a PC with software to measure the data throughput with an internal timer. The evaluating device 20 determines the time needed to receive the respective data frames and stores them. After all data frames (or a number high enough to enable the evaluation) belonging to the pattern of storage areas with altered latencies are measured and their respective latencies are stored, the, evaluating device 20 can compare the measurement result (or parts thereof) with the key used to record the corresponding original record carrier to determine if the read disc is an original disc or a copied disc.

FIG. 9 shows a flowchart of an exemplary procedure to verify a record medium according to the present invention, i.e. to compare the different latencies with the key used to generate them, which is executed in a processor of the record medium verifying device according to FIG. 8. The verification procedure starts in a tenth step S10 with the calculation of the key that was used to emboss the latency variations onto the record medium. This calculation is based on the known pseudo-random process, the known length of the key and the known initialization number, i.e. seed for the pseudo-random process. Alternatively, the key might get retrieved from some storage.

Thereafter, in an eleventh step S11 a start value s is chosen randomly in an allowed sector range, i.e. range of sectors (=storage areas in this case) that builds the pattern of storage areas with altered latencies. In this random choosing of the start value s there is the restriction that s_min sectors are available following the sector with number s within the sector range, wherein s_min is the number of sectors needed to have the possibility to obtain a positive verification result, i.e. the minimum number needed for the detection of the alterations of the latencies under observation of their amplitudes. Further, a variable i is set to this start value s. In a following twelfth step S12 the access time of sector i is measured. Then, in a following thirteenth step S13 this measured time is stored in a FIFO (first in first out) memory that has the length of the key. In a following fourteenth step S14 the key (or signature data derived from the key, e.g. the latencies embossed with the key) gets correlated with the contents of the FIFO memory. In a following fifteenth step S15 it is determined whether or not the correlation result is above a first threshold t1. In case this is true, a sixteenth step S16 is performed, in which a positive verification is determined. After the sixteenth step S16 the process ends.

In case the correlation result is not above the first threshold t1 in the fifteenth step S15, it is determined in a seventeenth step S17 whether or not a number of s_max sectors are read, wherein s_max is determined by subtracting s from the length, i.e. the number, of the storage areas with altered latencies. If this is not the case, an eighteenth step S18 is performed in which i gets incremented by 1. After this eighteenth step S18 the process continues with the twelfth step S12 and the access time of the next sector is measured.

In case it is determined in the seventeenth step S17 that s_max sectors are read, i.e. that all storage areas with altered latencies that follow the storage area with number s are read, a nineteenth step S19 is performed in which it is determined whether or not (read) errors occurred or extensive access times are detected during the reading and storing of the access times. If this is the case, the whole measurement, storing and correlation is repeated by continuing with the eleventh step S11.

In case no (read) errors occurred and no extensive access times are detected during the reading and storing of the access times, the process continues with a twentieth step S20, in which a filtering and/or post-processing of the stored measurement data is performed to remove spikes, compensate for read errors, and compensate for drive calibration (filtering) and to subtract an estimated access time for a given drive/disc from measurements (post processing). Thereafter, a correlation of the filtered and post-processed measurement data with the expected key or the key derived signature data is performed in a following twenty-first step S21. In a following twenty-second step S22 it is determined whether or not the correlation result lies above a second threshold t2. If this is the case, the process continues with the sixteenth step S16 in which a positive verification result is determined, i.e. that an original is detected, before it ends. Otherwise, the process continues with a twenty-third step S23 after the twenty-second step S22 to determine a negative verification. Depending of the process that calls this verification process, the verification could be retried or a fail of the verification is detected.

The setting of the first threshold t1 larger than the second threshold t2, i.e. t1>t2, allows to short-cut the time-consuming measurement if the correlation result is above the elevated first threshold t1. The second threshold t2 is the detection threshold.

Of course, in case the pattern of storage areas with altered latencies is not continuous, the eighteenth step S18 has to be performed different in that i determines the next storage area with altered latency, i.e. i is increase more than 1. Further, to store the measurement results, a different memory architecture might be used instead of a FIFO memory.

The frames observed for their latencies might be all frames of the record medium, i.e. the above procedure might start with the first storage area of the record medium. In case the read latencies match to the known key, the procedure determined a positive verification and stops. In case the read latencies do not match to the known key, the procedure stops after all storage areas are considered. Since the process is based on correlation, it can be easily adapted to different reading velocities. Further, to speed-up the procedure, only those storage areas belonging to the pattern of storage areas with altered latencies might get considered for measuring the respective latencies.

Also in case the storage areas, in which the latency deviations are embossed, are not absolutely known, e.g. in case of a recordable or rewritable record medium, the method according to the present invention can nevertheless verify whether or not the record medium is an original or a copy, since the relation of these storage areas to each other is known and reflected in the known key. Therefore, as long as the latencies of a range of storage areas that includes all storage areas with altered latencies (or a part that is sufficient for the verification) are measured, the correlation result definitively indicates whether or not the tested record medium is an original.

FIG. 10 shows a principle view of an emulator or emulator software emulating the different latencies of a record medium according to the present invention e.g. when accessing a copy thereof that does not show the different latencies.

In particular, the upper part of FIG. 10 shows on the right hand side a copy 34 of a record medium according to the present invention with a signature based on different latencies, i.e. which copy 34 also shows the signature according to the present invention. When a reading is performed from the copy 34 with signature, the corresponding blocks of data 26 arrive at a verification means 30 with a varying speed. In the shown example there exist in an alternating way first areas 28 with a first time distance between two blocks of data 26, e.g. a 'normal' time distance, and second areas 27 with a second time distance between two blocks of data 26 that is shortened in comparison to the first time distance, i.e. two consecutive blocks of data 26 within the second areas 27 arrive at the verification means 30 within a shorter period than two consecutive blocks of data 26 within the first areas 28.

The verification means 30 might be a software or a hardware realization that determines the latencies of the storage areas of the record medium (or at least of the storage areas of the pattern of storage areas with altered latencies, or at least a part thereof that is sufficient for the verification) and compares the measured latencies with the key used to emboss the latency deviations onto the record medium. It might be that the verification means 30 knows the latency deviations e.g. from a data base or from the recording medium itself that holds the initialization number, preferably in an encrypted form, and then simply compares these latencies to the speed with which the read blocks of data 26 arrive. In case of an arriving speed corresponding to the known latency deviations for the respective corresponding storage areas, an original is verified and access will be granted. In case of a mismatch, an illegal copy is detected and access is denied.

The middle and lower part of FIG. 10 show the access of a recording medium that carries a copy 35 without the signature, i.e. which does not show latencies deviating from the standard latencies. Such copies 35 without signature might be generated by copying the data of an original onto a CDR, CDRW, DVD-R, DVD+R, DVD-RW, DVD+RW, on a hard drive, into RAM or Memory Stick or any other type of recordable media or devices. Also an access of the data via a network is possible.

In the middle part of FIG. 10 the blocks of data 26 arrive with constant speed at the verification means 30, in this case with a speed corresponding to that of the first areas 28 of the upper part of FIG. 10 with a first time distance between two blocks of data 26. Since the blocks of data 26 in the middle part of FIG. 10 do not arrive at different speed at the verification means 30, in this case directly determined by the constant reading speed with which the copy 35 without signature was read, the verification means denies the access to the data on the recording medium.

In the lower part of FIG. 10 the blocks of data 26 are also read with a constant speed from the copy 35 without the signature, as in the middle part of FIG. 10. However, before the blocks of data 26 are fed to the verification means 30, they arrive with constant speed at an emulator 29. The emulator 29 generates the signature according to the present invention according to the key or the pseudo-random process and the seed so that the corresponding blocks of data 26 arrive at a verification means 30 with a varying speed corresponding to that of the original, e.g. corresponding to the first areas 28 and second areas 27 as shown in the upper part of FIG. 10. Therefore, since the blocks of data 26 in the lower part of FIG. 10 arrive at different speeds at the verification means 30 that correspond to the different speeds of the corresponding original, e.g. of the copy 34 with signature, in this case determined by the emulator 29, the verification means grants the access to the data on the recording medium.

The emulator 29 might be a software or a hardware realization that determines the respective latencies of every storage area or at least predetermined storage areas on the recording medium e.g. on basis of a data base reflecting the latency variations or on basis of the key used to produce the original, and then adapts these latencies to the speed with which the read blocks of data 26 are output from the emulator 29 and arrive at the verification means 30.

Further, as also described in the general portion of the specification, the present invention is not only applicable to the before described optical or magneto-optical recording media which preferably rotate and alter the latency on basis of a line speed variation, but also other storage media which latencies might be altered are applicable to the present invention. Also, the emulator according to the present invention might not only emulate different latencies of optical or magneto-optical recording media which preferably rotate, but also of further storage media.

The invention claimed is:

1. A recording medium comprising:
   storage areas with respective standard latencies, latency being a waiting time from a request of data stored in a storage area to a receiving of the requested data, and
   a pattern of the storage areas, having their respective latencies altered with respect to the respective standard latencies by modulating the respective standard latencies based on a key, the key being selected such that the alteration of a respective latency of a storage area lies within a measurement noise of latency measurements with respect to the standard latency of said storage area, the measurement noise being created when the measurement is performed with a reading device for accessing said recording medium.

2. The recording medium according to claim 1, wherein said recording medium is an optical or a magneto-optical record carrier comprising:
   memory blocks of a predetermined amount of storage capacity as said storage areas, wherein said respective standard latencies are determined based on a density of bits written in said memory blocks according to a standard procedure for writing the bits into said memory blocks, and
   said altered latencies of said memory blocks forming said pattern are shorter or longer latencies than said respective standard latencies, achieved by writing the bits with greater or lesser density into the respective memory blocks.

3. The recording medium according to claim 2, wherein said optical or a magneto-optical record carrier is a read-only record carrier, or a recordable or rewriteable record carrier.

4. The recording medium according to claim 1, wherein said key is generated on basis of a pseudo-random process with a predetermined initialization number.

5. The recording medium according to claim 1, wherein said key is a sequence of numbers having a Gaussian distribution that is generated on basis of a pseudo-random process, and each of the sequence of numbers is used to alter the latency of at least one predetermined storage area.

6. The recording medium according to claim 1, wherein a predetermined number of consecutive storage areas within said pattern of storage areas have the same altered latency.

7. A recordable or rewriteable recording medium, comprising:
a storage region configured to store pre-formatted recording density information to obtain storage areas with respective standard latencies after recording data onto the recording medium, latency being a waiting time from a request of data stored in a storage area to a receiving of the requested data, and
said pre-formatted recording density information indicating a pattern of the storage areas, having their respective latencies altered by modulating the respective standard latencies based on a key, the key being selected such that the alteration of a respective latency of a storage area lies within a measurement noise of latency measurements with respect to the standard latency of said storage area, the measurement noise being created when the measurement is performed with a reading device for accessing said recording medium.

8. The recordable or rewritable recording medium according to claim 7, wherein the recording medium is an optical or a magneto-optical record carrier and said pre-formatted recording density information is a frequency information written to a pre-groove of the recording medium, further comprising:
memory blocks of a predetermined amount of storage capacity as said storage areas, wherein said respective standard latencies are achieved when said frequency information indicates a density of bits to be written into said memory blocks according to a standard procedure for writing the bits into said memory blocks, and said altered latencies of said memory blocks forming said pattern are shorter or longer latencies than said respective standard latencies achieved by writing the bits with greater or lesser density into the memory blocks based on an altered frequency information.

9. The record medium according to claim 7, wherein said key is generated on basis of a pseudo-random process with a predetermined initialization number.

10. The record medium according to claim 9, wherein said key is a sequence of numbers having a Gaussian distribution that is generated on basis of a pseudo-random process, and each of the sequence of numbers is used to alter the latency of at least one predetermined storage area.

11. The record medium according to claim 7, wherein a predetermined number of consecutive storage areas within said pattern of storage areas have the same altered latency.

* * * * *